June 4, 1935.  W. C. MILLER ET AL  2,003,302
SAFE STRUCTURE
Filed Aug. 2, 1933  15 Sheets-Sheet 1
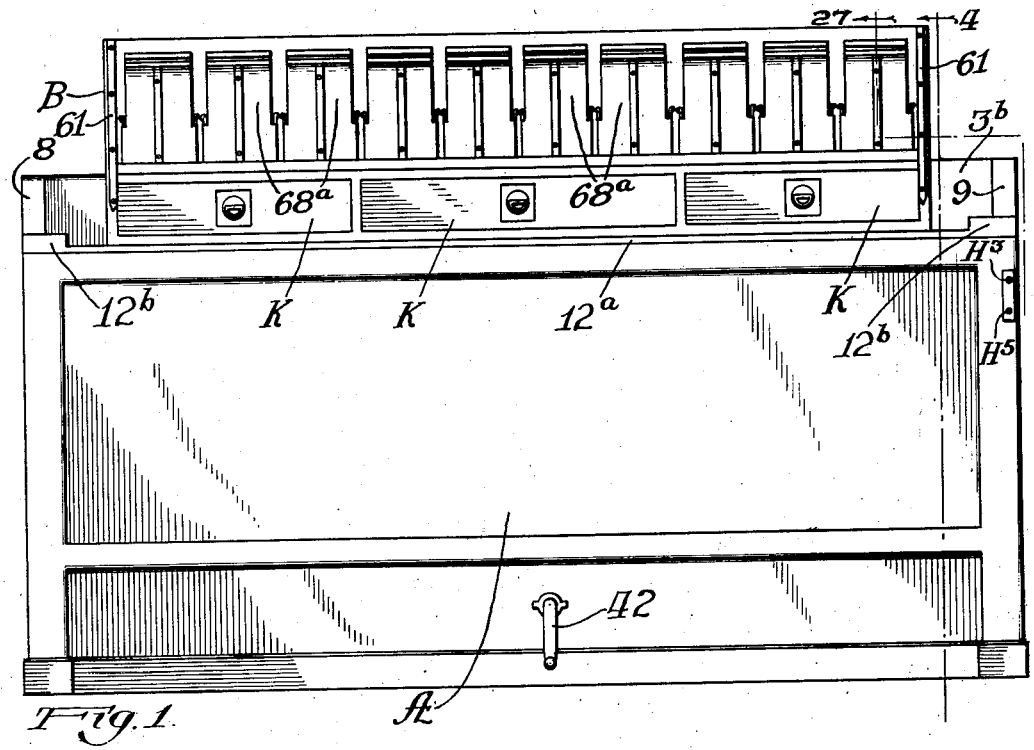
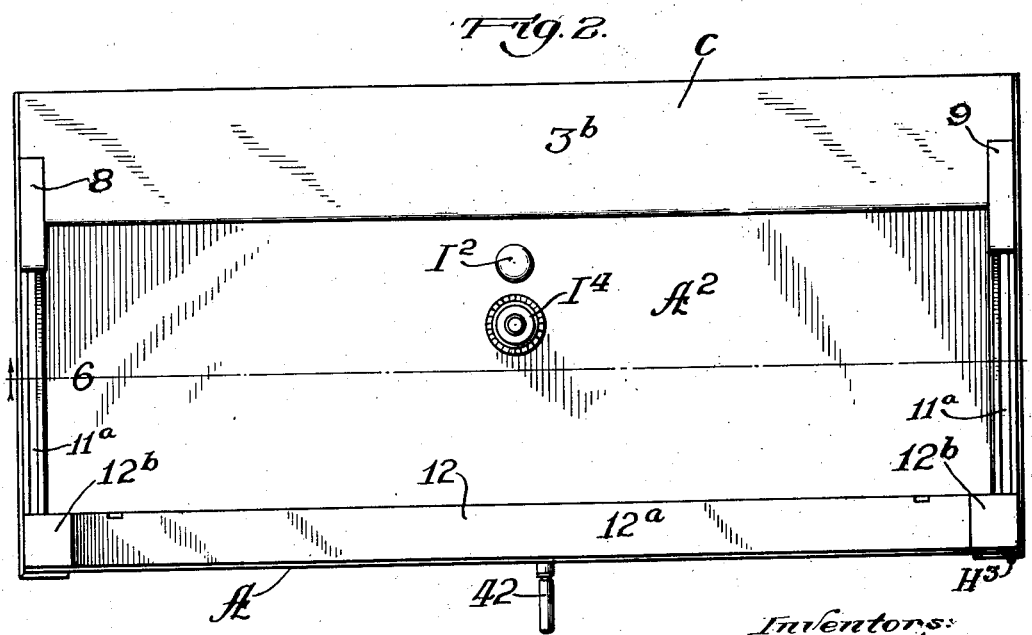
Inventors:
William C. Miller,
Albert L. Abbott.
By Dynenforth, Lee, Chritton & Wiles,
Attorneys

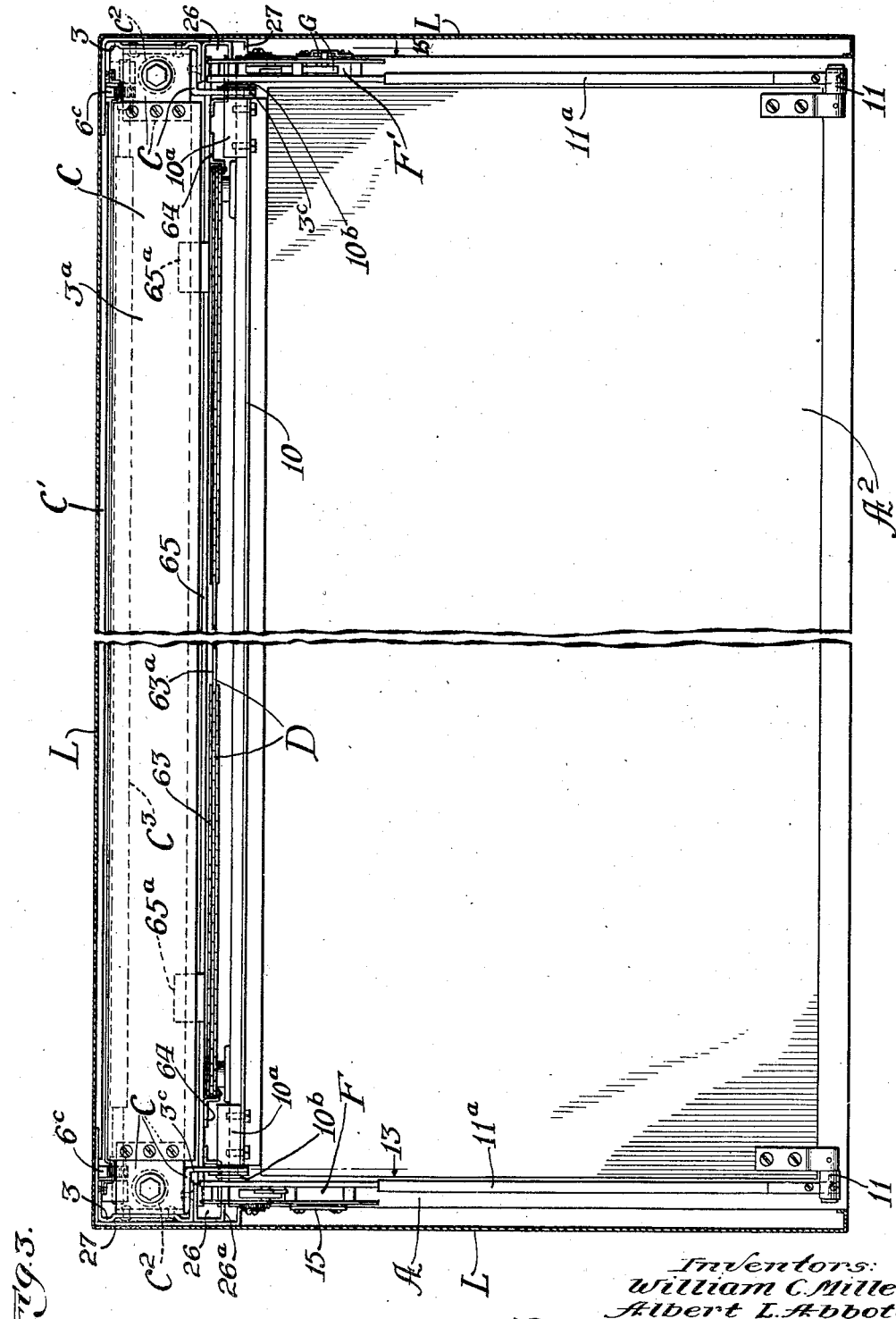

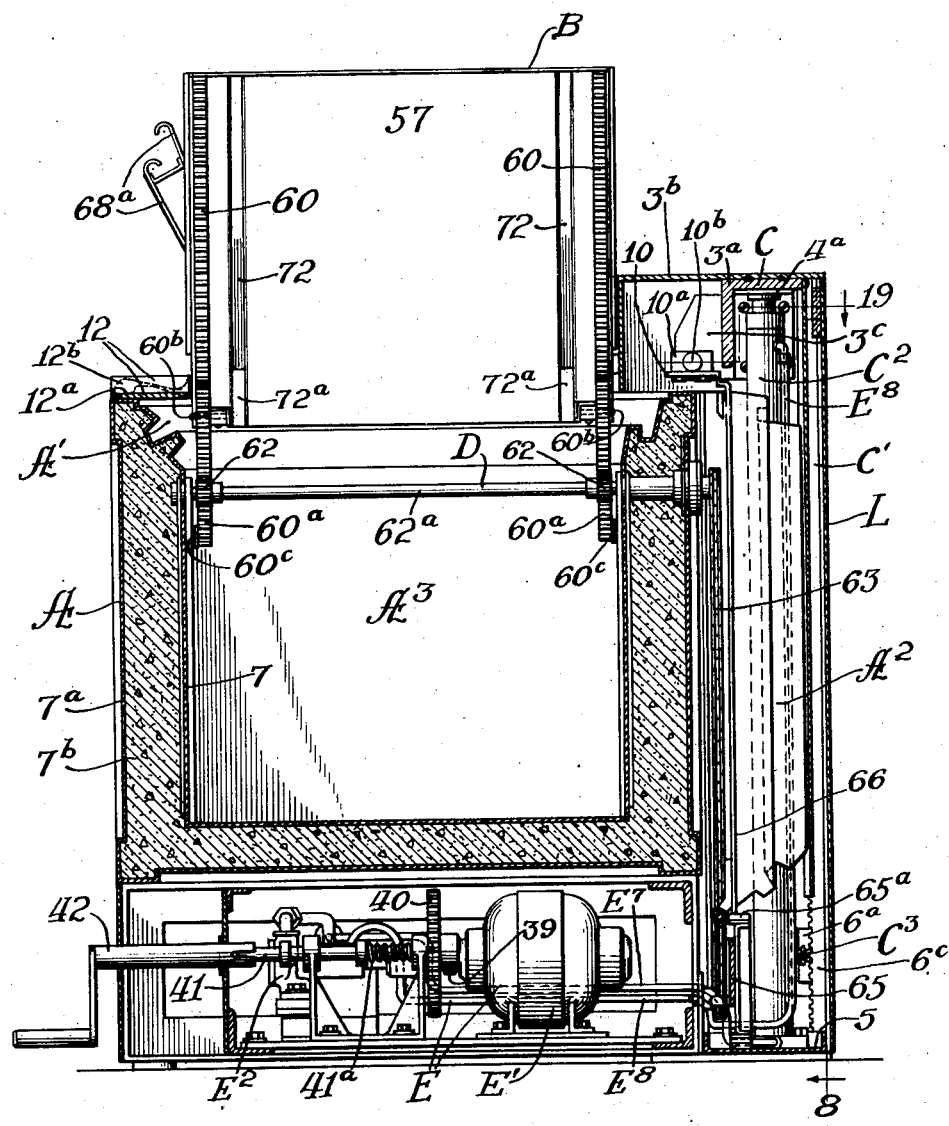

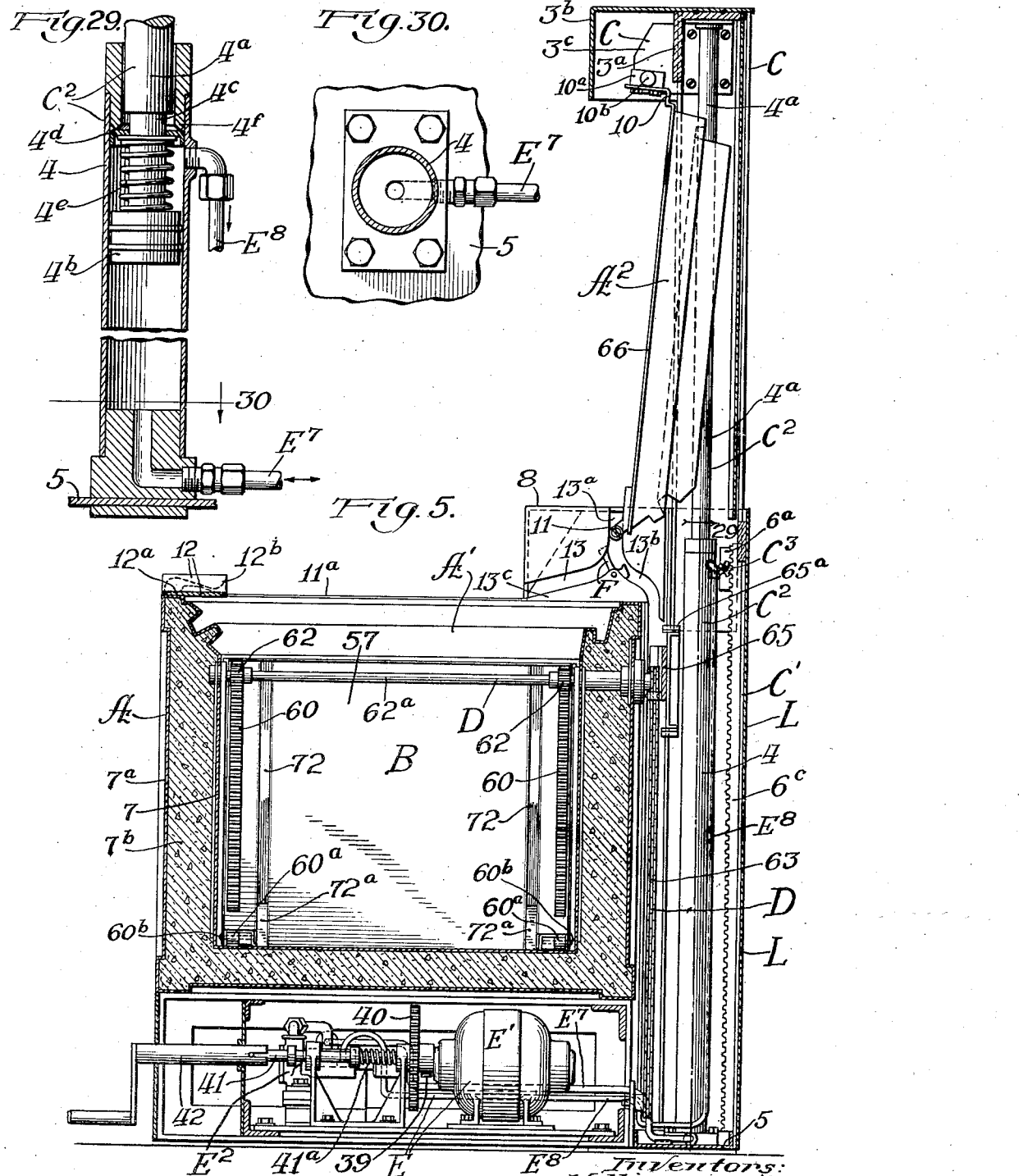

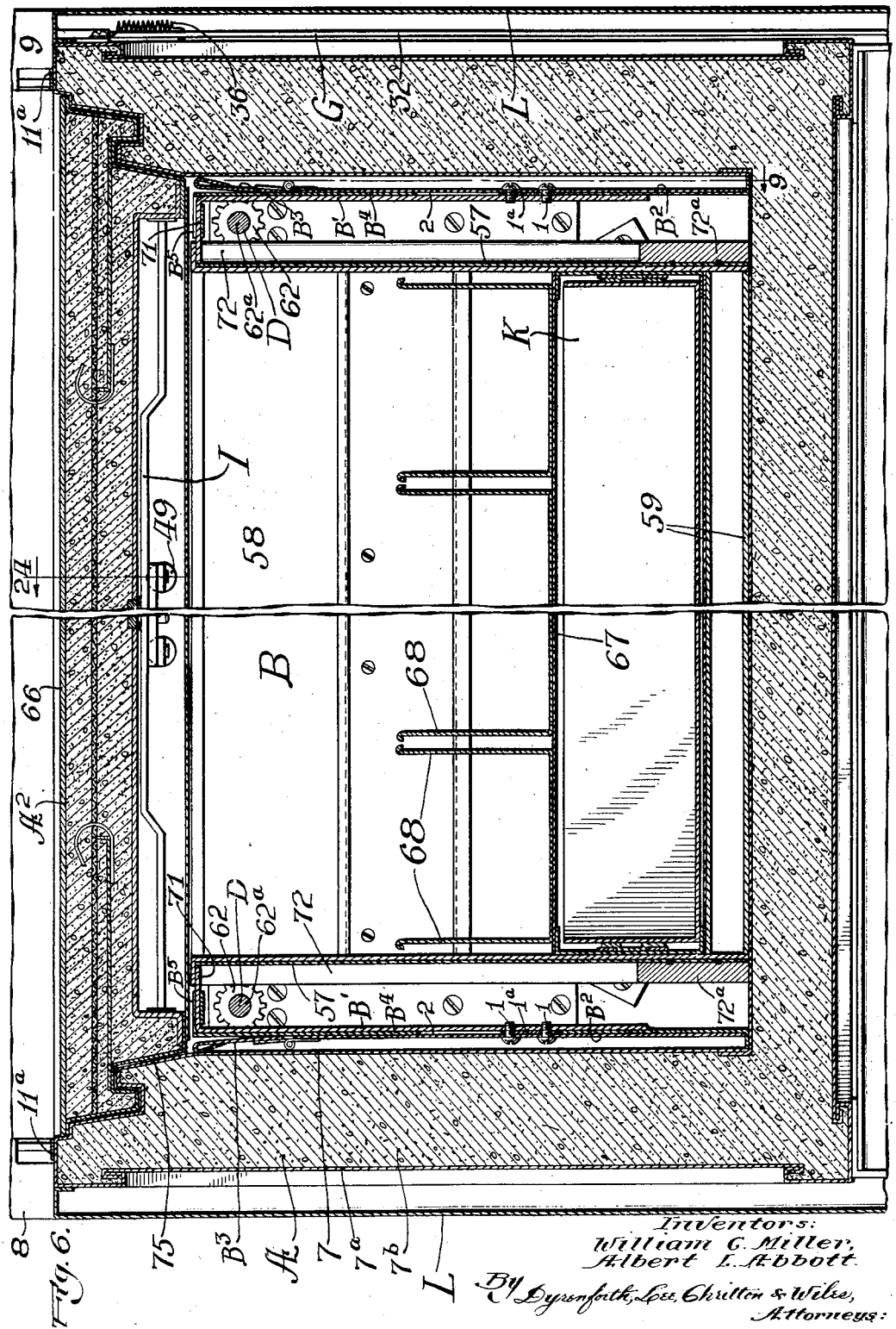

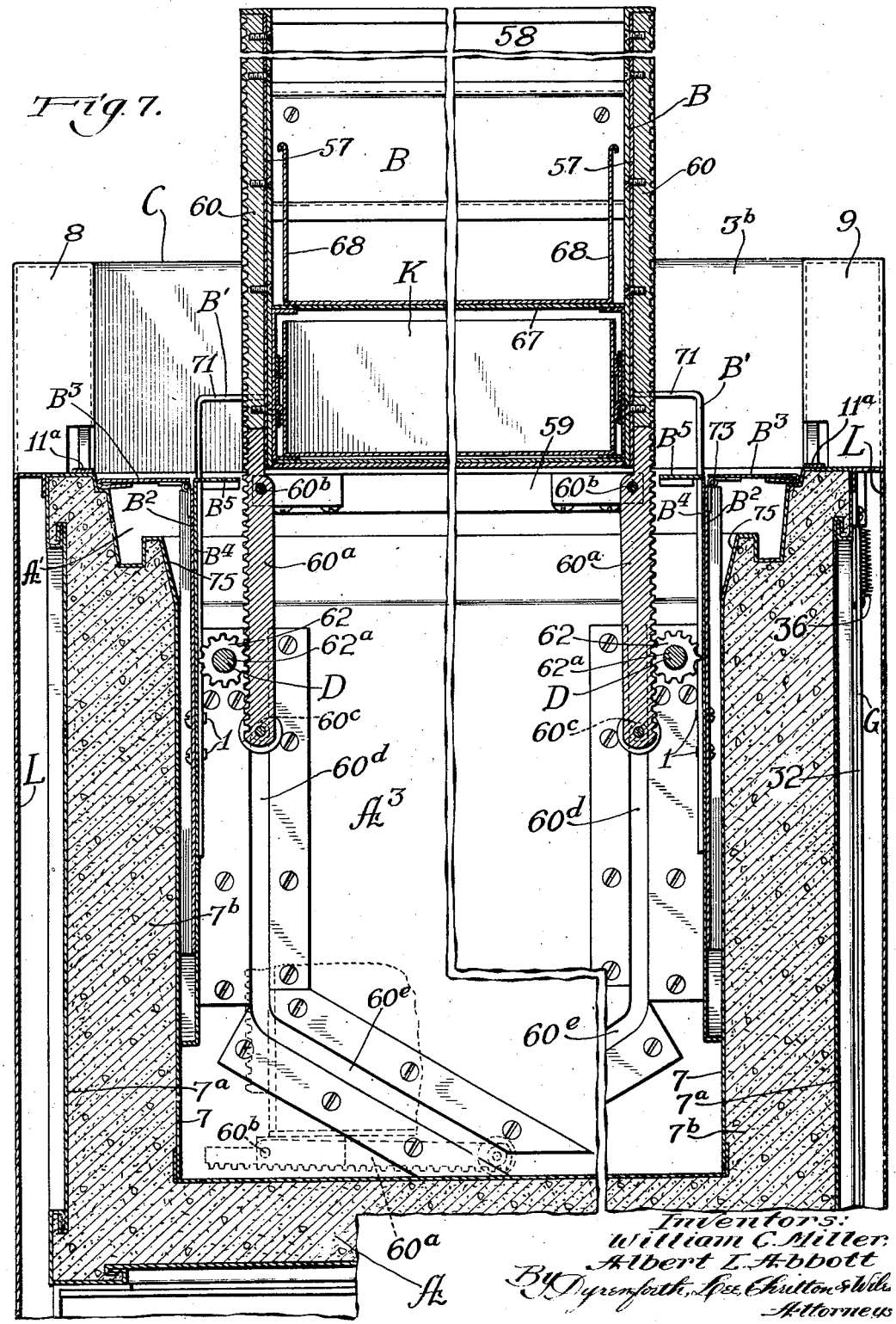

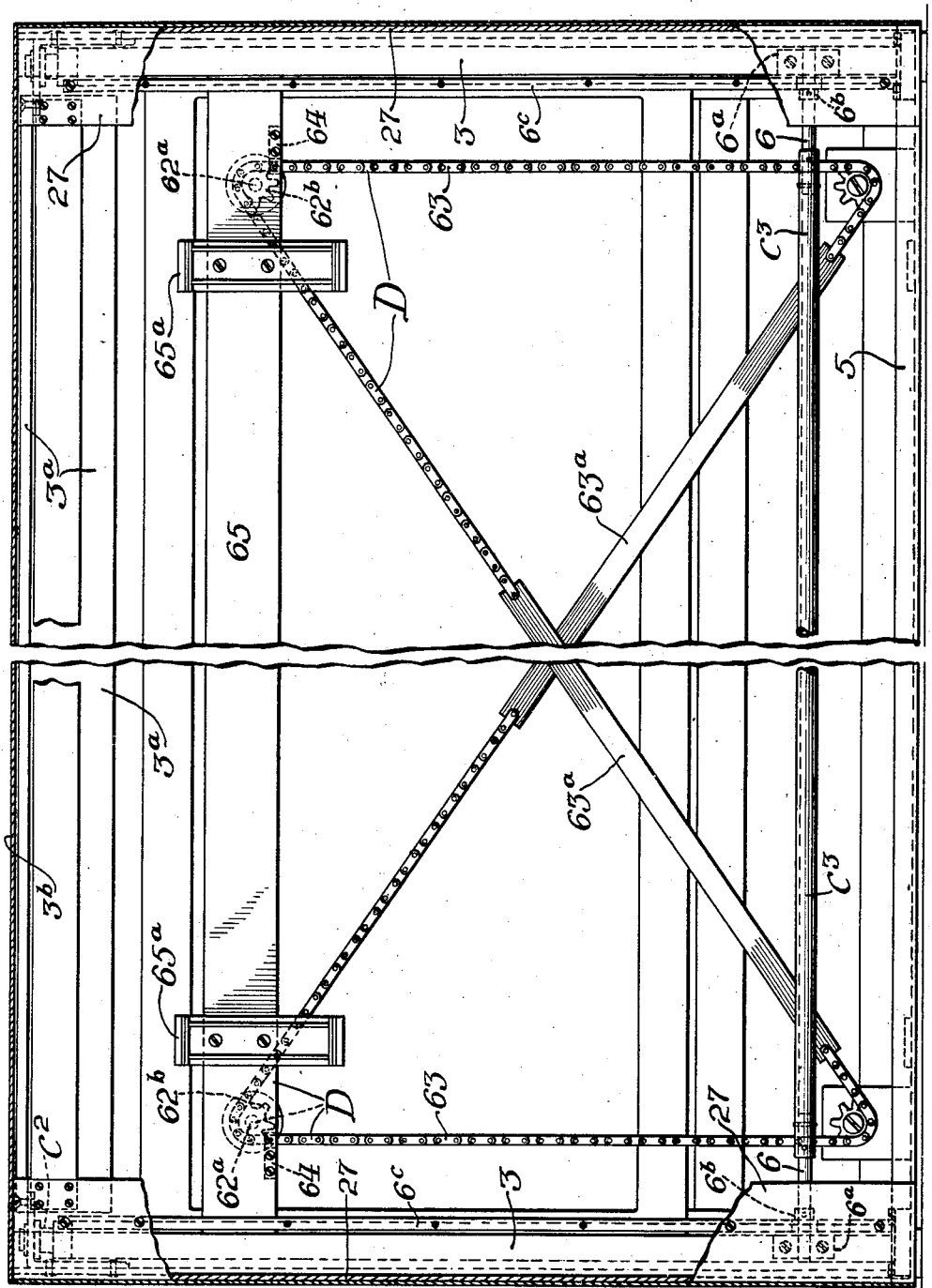

June 4, 1935.　　W. C. MILLER ET AL　　2,003,302
SAFE STRUCTURE
Filed Aug. 2, 1933　　15 Sheets-Sheet 8
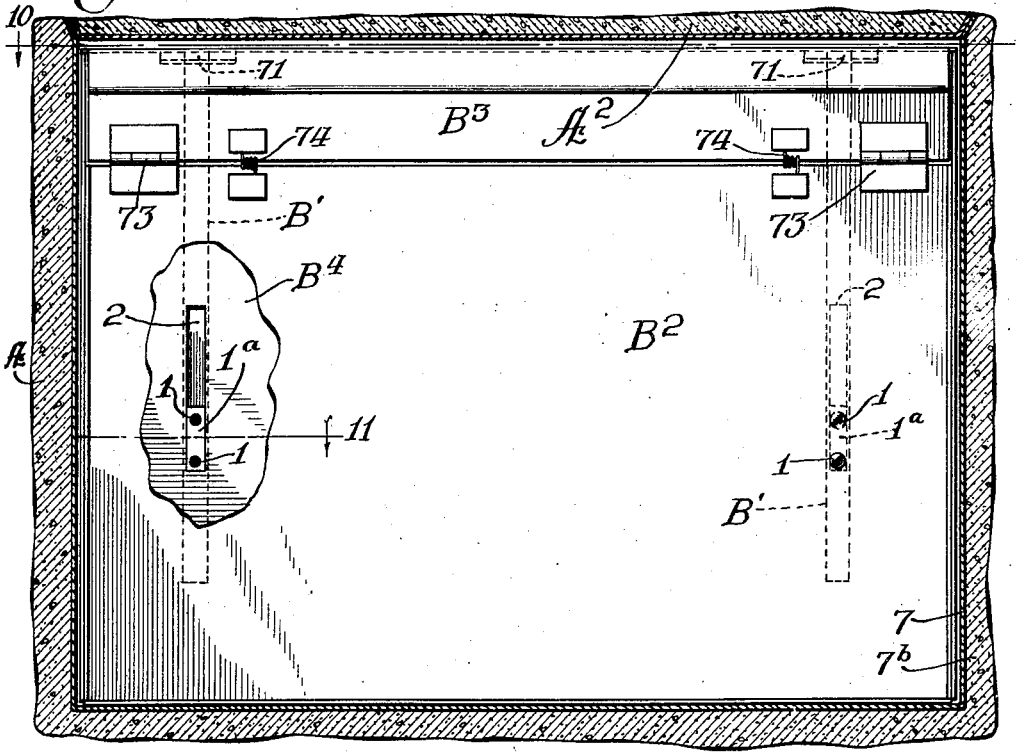
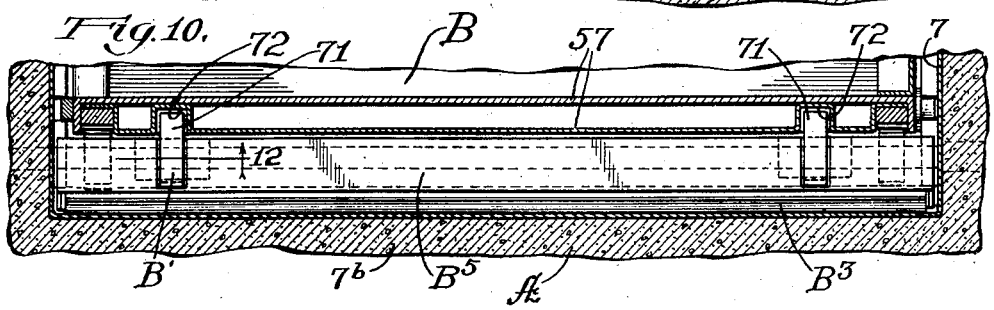
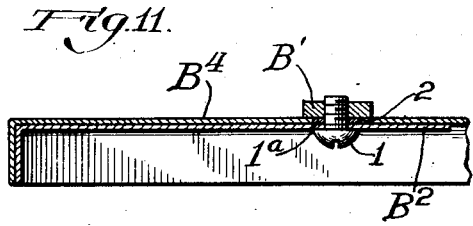
Inventors:
William C. Miller,
Albert L. Abbott.
By Dyrenforth, Lee, Chritton & Wiles,
Attorneys.

June 4, 1935.   W. C. MILLER ET AL   2,003,302
SAFE STRUCTURE
Filed Aug. 2, 1933   15 Sheets-Sheet 9

Inventors:
William C. Miller,
Albert L. Abbott,
By Dysmyth, Lyn, Chittin & Wiles,
Attorneys.

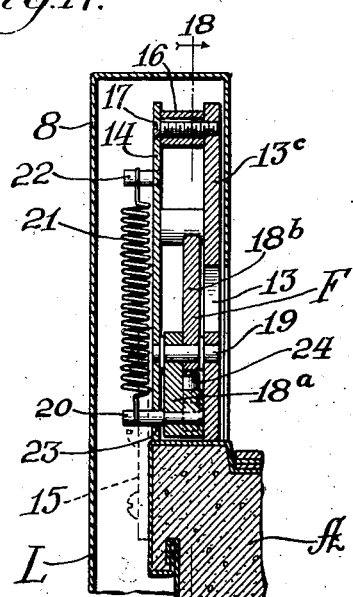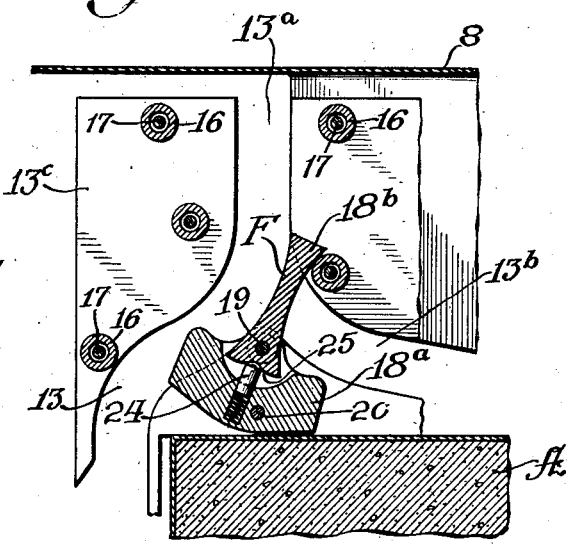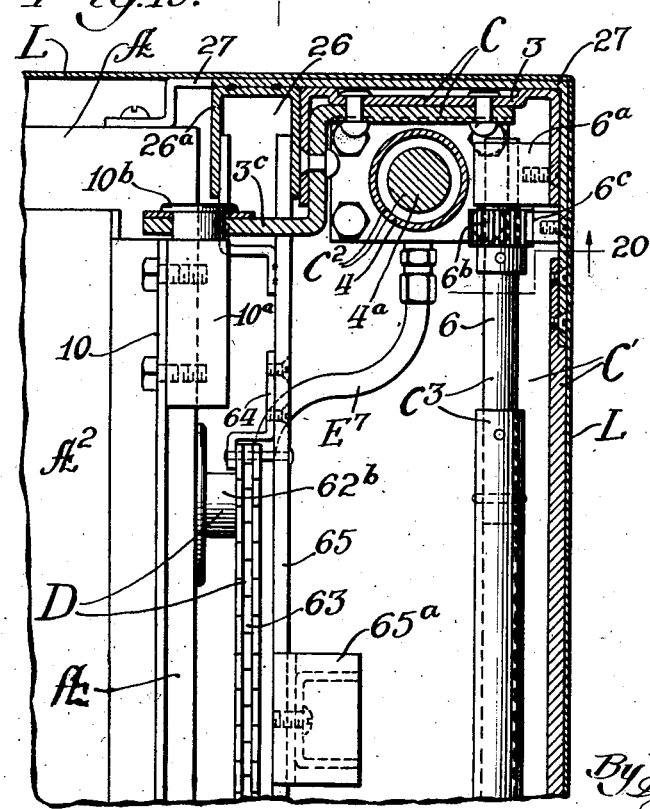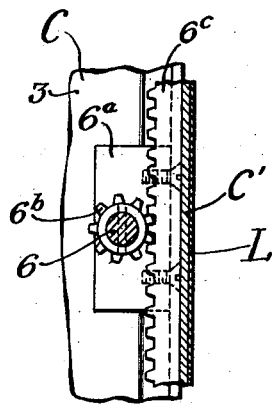

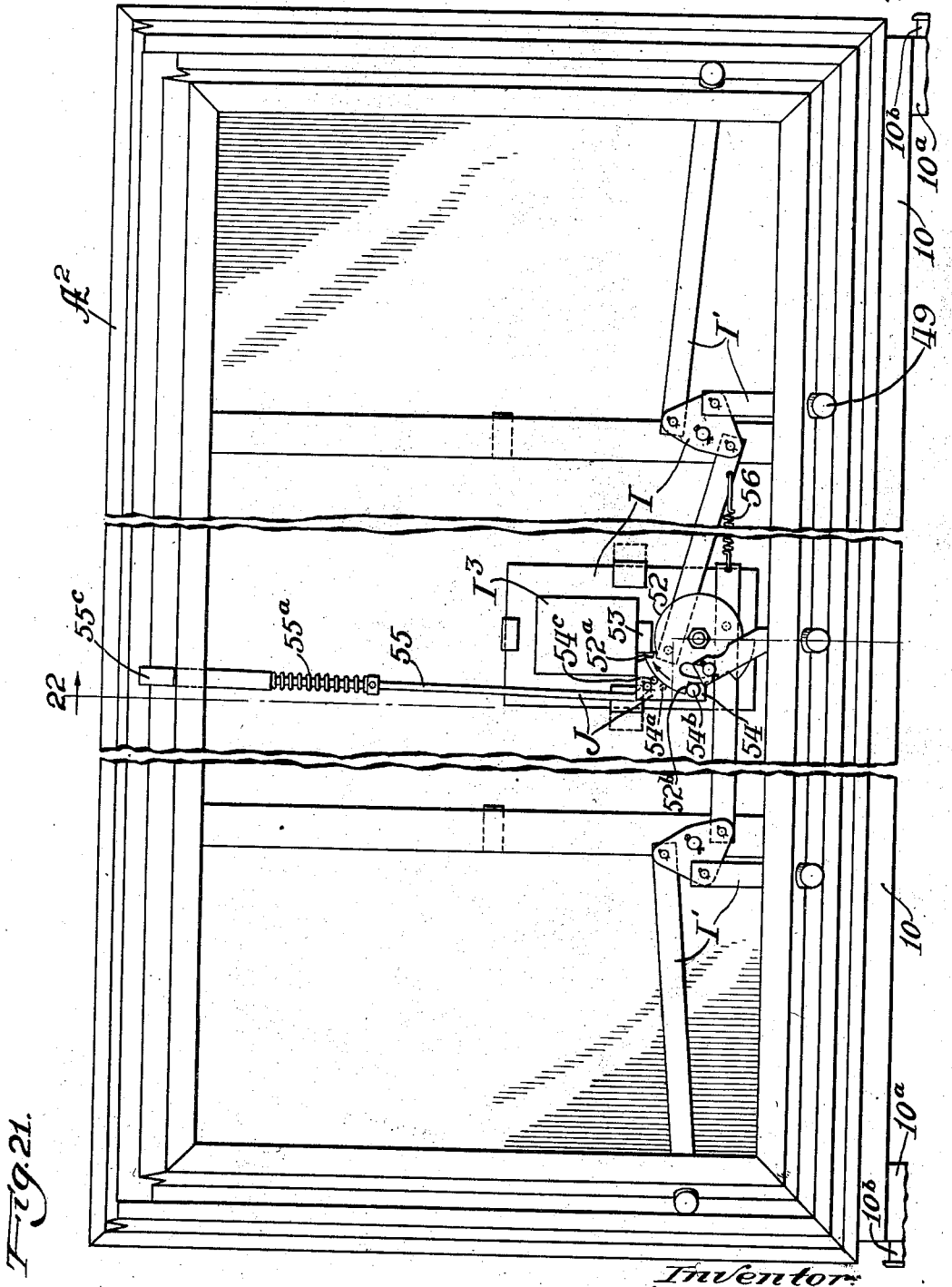

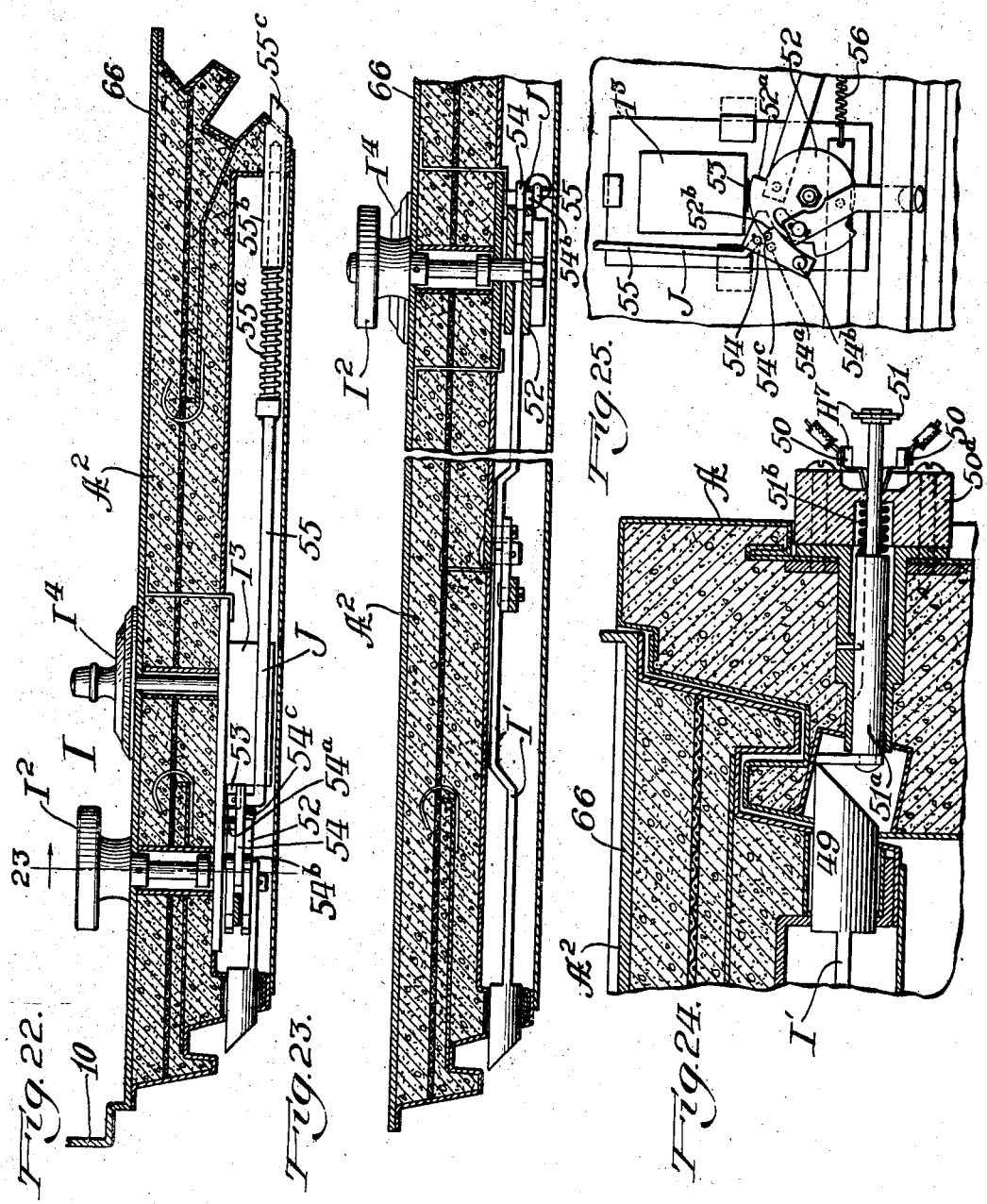

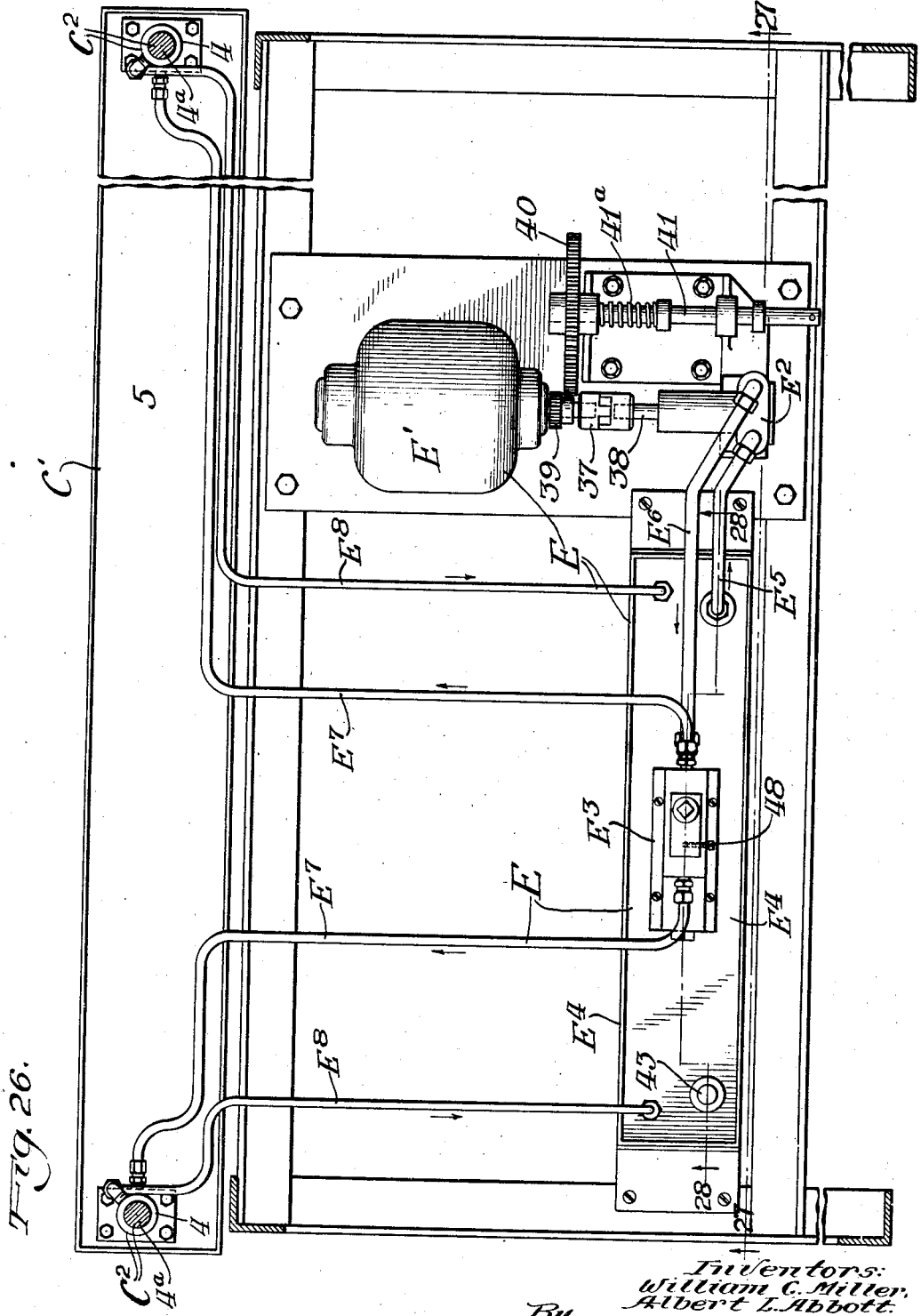

June 4, 1935.  W. C. MILLER ET AL  2,003,302
SAFE STRUCTURE
Filed Aug. 2, 1933  15 Sheets-Sheet 14
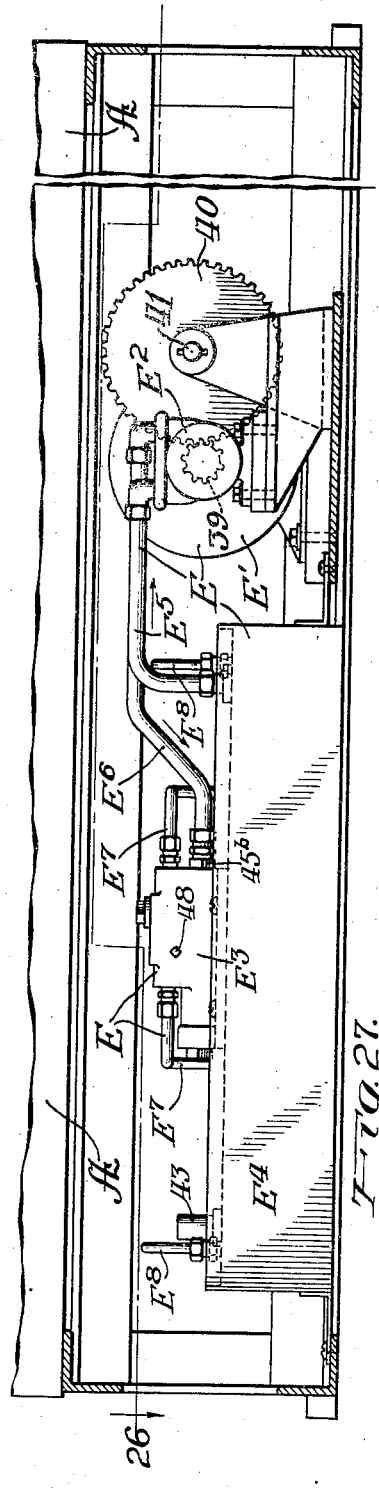
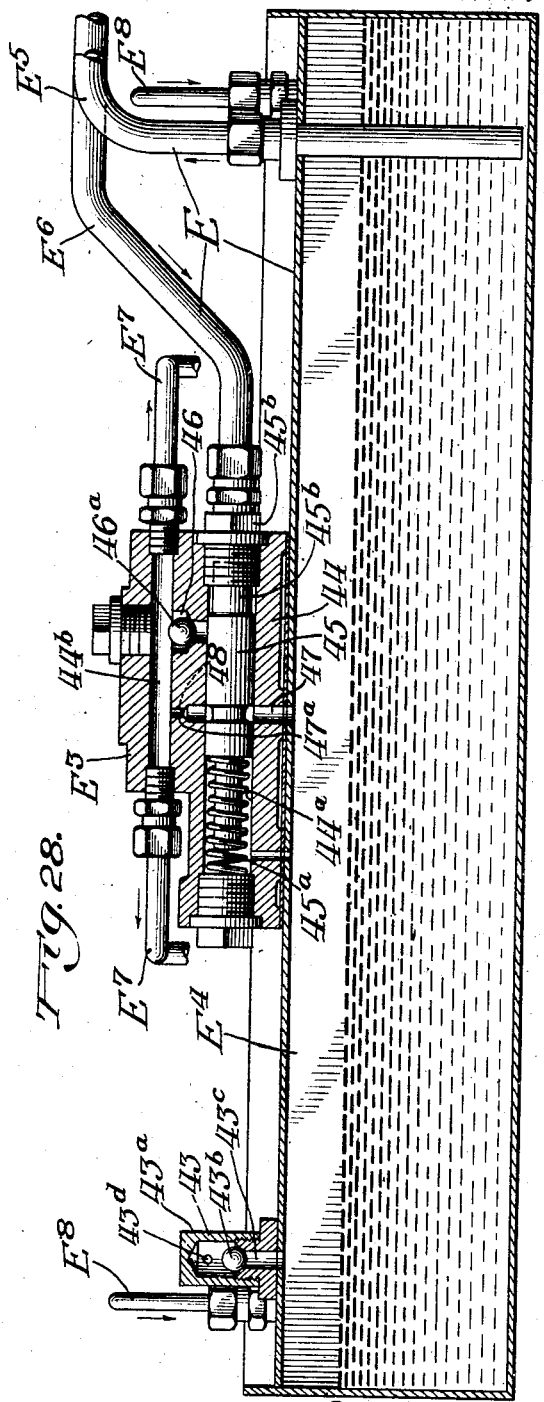
Inventors:
William C. Miller,
Albert L. Abbott.
By Dyrenforth, Lee, Chritton & Wiles
Attorneys

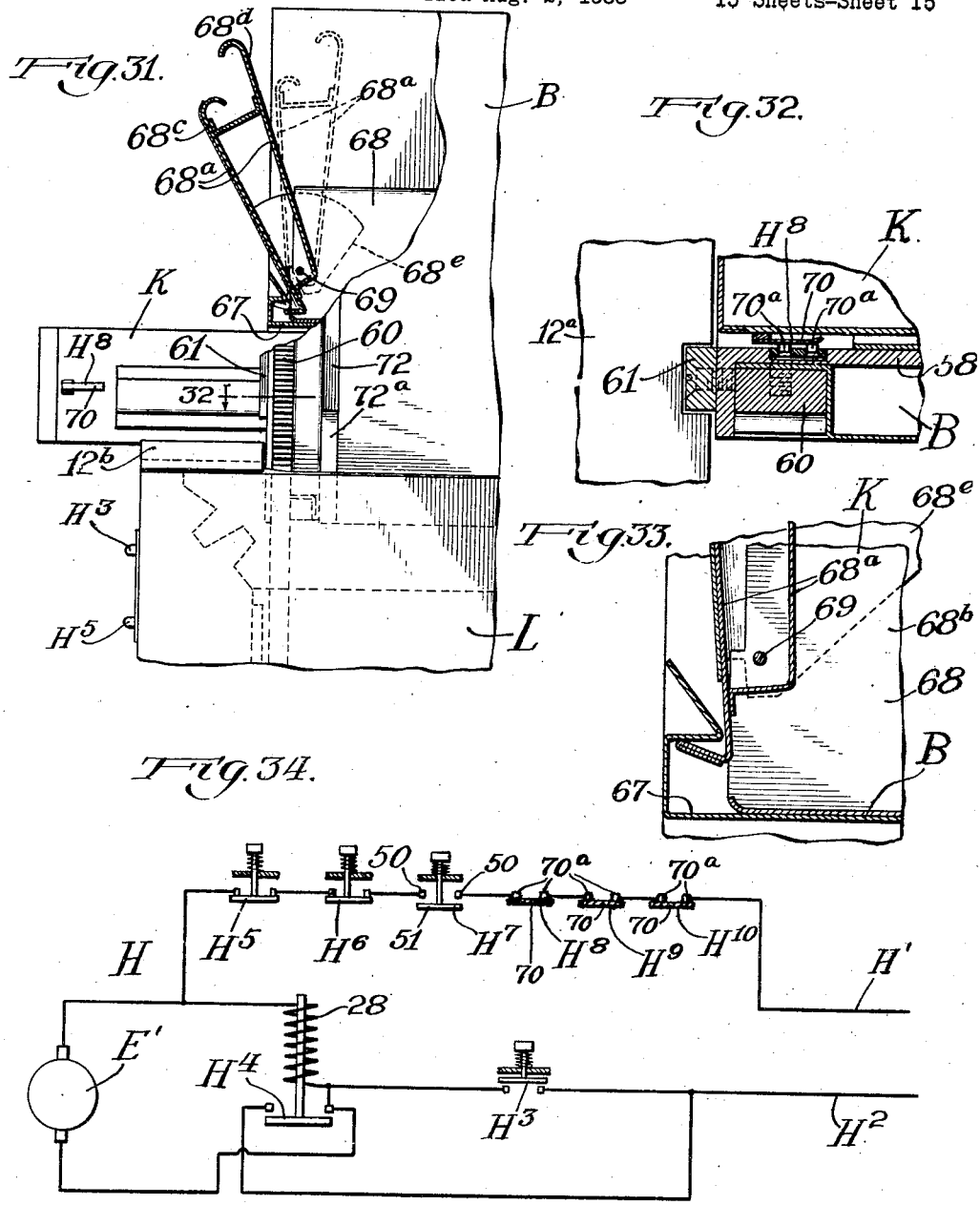

Patented June 4, 1935

2,003,302

UNITED STATES PATENT OFFICE 2,003,302

SAFE STRUCTURE

William C. Miller and Albert L. Abbott, Canton, Ohio, assignors to Diebold Safe & Lock Co., Canton, Ohio, a corporation of Ohio Application August 2, 1933, Serial No. 683,384

30 Claims. (Cl. 109—1)

This invention relates particularly to safe-structures which are adapted for housing currently-used record-cards, record-sheets, signature cards, etc. Such safes are equipped, commonly, with projectable trays, or article-holders, which normally are housed within the safe-body, but which may be elevated to give ready access to the records during working hours.

The present invention constitutes a modification of the safe, or receptacle, described and claimed in the William C. Miller application S. N. 595,897, filed February 29, 1932.

The primary purpose of the present invention is to provide improved means for actuating the closure and article-holder in a safe of the type mentioned above. Additional features of improvement will appear from the description which follows.

The invention is illustrated in a preferred embodiment in the accompanying drawings, in which—

Figure 13:
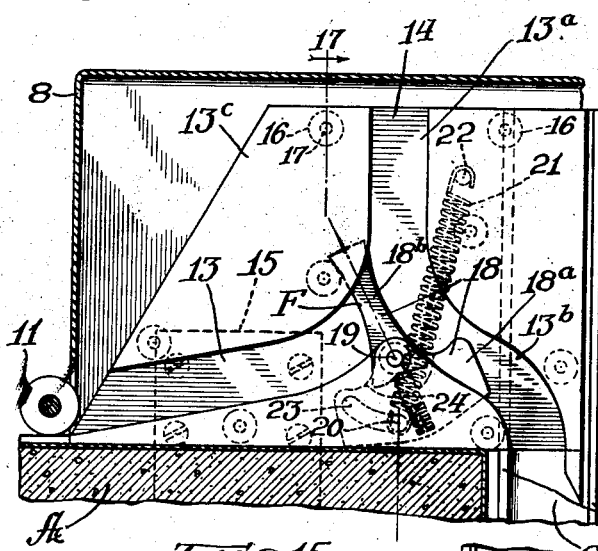
Figure 14:
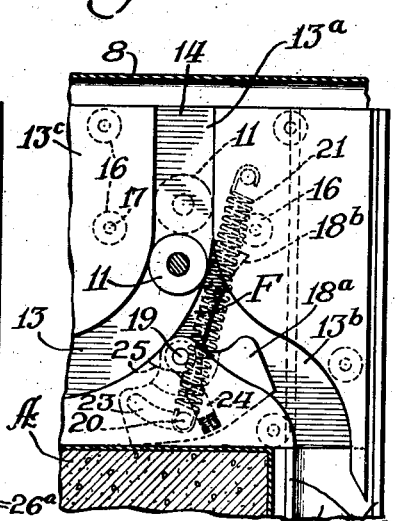
Figure 15:
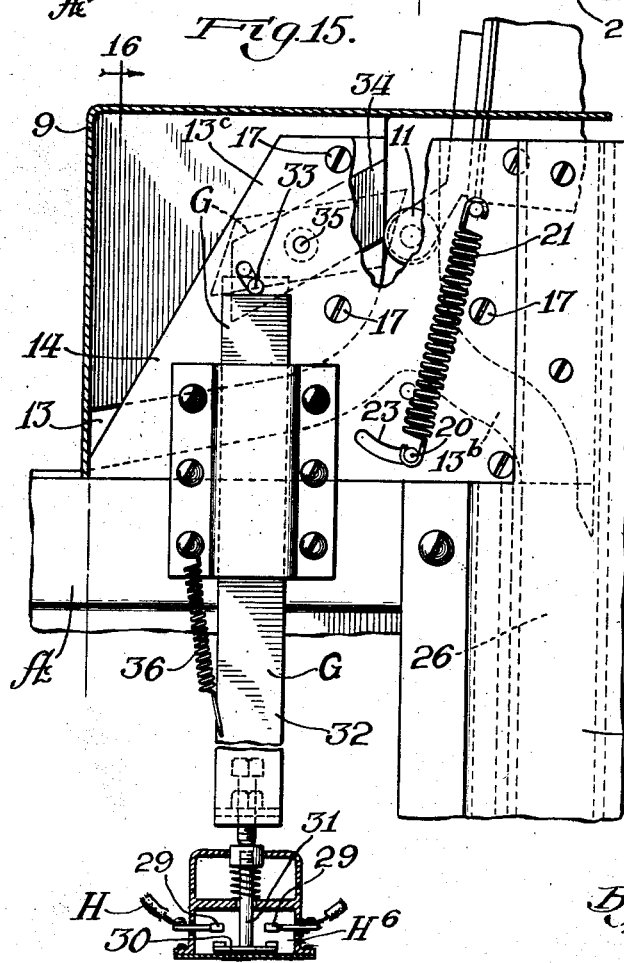
Figure 16:
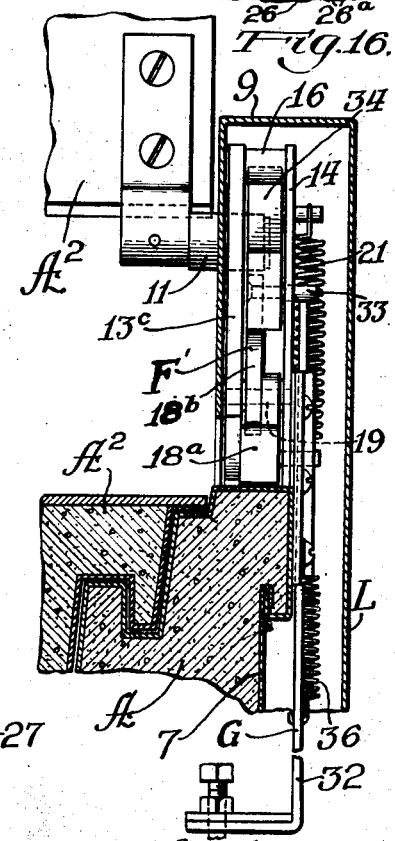

Fig. 1 is a front elevational view of a safe embodying the invention, the safe being shown in fully opened position; Fig. 2, a plan view of the safe in closed position; Fig. 3, a plan sectional view of the safe, the closure, or door, which forms a top wall for the safe being shown in plan; Fig. 4, a vertical sectional view in a plane perpendicular to the front wall of the safe, the view being taken as indicated at line 4 of Fig. 1, and the safe being shown in fully open position; Fig. 5, a section similar to Fig. 4, showing the fluid-pressure lift and the door carried thereby in elevated position, ready to be lowered to a position back of the main rear wall of the safe-body, the article-holder being omitted from the view; Fig. 6, a vertical sectional view parallel to the front wall of the safe, the section being taken as indicated at line 6 of Fig. 2, looking rearwardly; Fig. 7, a view similar to Fig. 6, but showing the door in the idle, vertical position and showing the article-holder in elevated position; Fig. 8, a vertical sectional view taken as indicated at line 8 of Fig. 4, looking forwardly, this view illustrating the means for actuating the article-holder; Fig. 9, a broken vertical sectional view taken as indicated at line 9 of Fig. 6, one end of the safe-body having been removed to expose a vertically movable plate which is actuated by the article-holder and which carries a lateral groove-closure which serves to cover a groove in the door-jamb with which the safe-body is provided at its open upper end; Fig. 10, a broken plan sectional view taken as indicated at line 10 of Fig. 9; Fig. 11, a broken plan view on an enlarged scale, taken as indicated at line 11 of Fig. 9; Fig. 12, a broken vertical sectional view taken as indicated at line 12 of Fig. 10; Fig. 13, a broken vertical sectional view parallel with one end wall of the safe, showing a track-switch employed for switching the guide-rollers with which the front edge of the door is equipped from one track to another, after the door has reached its fully elevated position; Fig. 14, a similar view, showing the track-switch in a different position; Fig. 15, a broken vertical sectional view at the opposite end of the safe, showing the means for actuating a limit-switch for breaking the circuit of the electric motor when the door reaches the upper end of its traverse; Fig. 16, a broken vertical sectional view taken as indicated at line 16 of Fig. 15, this view illustrating both the circuit breaker and the track-switch at this end of the safe; Fig. 17, a broken vertical sectional view taken as indicated at line 17 in Fig. 13; Fig. 18, a broken vertical sectional view taken as indicated at line 18 of Fig. 17, Fig. 19, a broken plan sectional view on an enlarged scale, taken as indicated at line 19 of Fig. 4; Fig. 20, a broken vertical sectional view taken as indicated at line 20 of Fig. 19 and showing a detail of the equalizing device for insuring coordinated movement of the vertical slide-members of the fluid-pressure lift, it being noted that the upper ends of said slide-members are connected by a bar, as shown in Figs. 3 and 5; Fig. 21, an inner plan view of the door, or closure, of the safe-body; Fig. 22, a section taken as indicated in line 22 of Fig. 21; Fig. 23, a broken sectional view taken as indicated at line 23 of Fig. 22; Fig. 24, a broken sectional view, on a larger scale, the section being taken as indicated at line 24 of Fig. 6, this view showing a lock-controlled switch which controls the electric motor and prevents operation of the motor till after the bolt-work of the door has been withdrawn; Fig. 25, a view of a portion of the mechanism shown in Fig. 21, but with the parts in a different position, the bolt-work being temporarily latched in unlocked position by a safety-latch device; Fig. 26, a plan sectional view taken as indicated at line 26 of Fig. 27, illustrating the means for operating the hydraulic rams employed for actuating the door-lift; Fig. 27, a vertical sectional view taken as indicated at line 27—27 of Fig. 26; Fig. 28, a broken vertical sectional view taken as indicated at line 28—28 of Fig. 26; Fig. 29, (Sheet 4), a broken vertical sectional view illustrating one of the rams employed; Fig. 30, a broken sectional view taken as indicated at line 30 of Fig. 29; Fig. 31, a broken vertical sectional view of the front portion of the safe, showing the article-holder in elevated position and one of the signature-card drawers drawn forwardly to the open position; Fig. 32, a broken plan sectional view taken as indicated at line 32 of Fig. 31; Fig. 33, an enlarged detail sectional view of the device shown in the upper portion of Fig. 31, and Fig. 34, a diagrammatic view, illustrating the circuit of the electric motor employed for driving the pump which supplies pressure to the hydraulic ram.

In the illustration given, a vertical movable door-lift, actuated by a hydraulic ram, is employed; and an electric motor operates a pump which draws oil from a reservoir and forces the same through conduits leading to the lower end of the cylinders of the hydraulic ram. In these cylinders are mounted pistons whose upper ends are secured to the upper end of the vertically movable door-lift, which comprises, in the illustration given, a pair of vertically movable slides movable in upright guides mounted in a door-housing located back of the rear wall of the safe-body. The vertical slide-members are connected at their upper ends by a strong cross-member, and, preferably, the vertical slide-members are connected by an equalizer in the form of a journaled shaft equipped with pinions which work in fixed vertical racks mounted adjacent the rear wall of the vertical door-housing.

It may be noted, further, that the electric motor pumps the oil to the ram to cause the lift to elevate the door to the upper end of its traverse in effecting either the opening of the door or the closing of the door; that the circuit of the motor is then automatically interrupted by the limit-switch, whereupon the door settles down to either the housed idle vertical position or the closed position, depending upon which way the free front edge of the door is guided by the track-switches employed. As the lift settles down, the oil is forced out of the lower ends of the cylinders of the ram and back into the reservoir. Obviously, the resistance to the settling of the lift which carries the door may be regulated by the size of the passage which permits the return of the oil from the cylinders to the reservoir.

In addition to the limit-switch mentioned, it it preferred to employ a circuit-breaker which normally is held open by the bolt-work of the locking-mechanism until the bolt-work is released to permit the door to be opened; also, a normally open starting-switch is employed, which, on being momentarily closed, closes the circuit of an electromagnetically controlled switch which controls the motor circuit. A normally closed stop-switch is employed, also, by which the motor may be stopped at any instant, whereupon the door will return either to the closed position or the idle open position, depending upon its position at the instant the circuit is broken by opening the stop-switch. If the article-holder is equipped, in addition to the ordinary record-card files, with drawers for holding signature-cards, or the like, preferably each drawer controls a switch which closes when the drawer is closed; and the drawer-controlled switches must be closed before the motor can operate.

Describing the preferred construction illustrated, A designates a safe-body having at its top an upwardly presented door-opening A' (Fig. 5), in which is normally seated a bodily-shiftable closure, or door, A², the safe-body having beneath the door-opening a chamber A³; B, a projectable tray, or article-holder, normally housed in the chamber A³, said article-holder having associated therewith at its lateral sides a pair of lifter-bars B' whose upper ends have lost-motion connection with the lateral walls of the article-holder (see Figs. 6 and 7) and whose lower ends have secured thereto, as by screws 1, and intervening slide-blocks 1ª, vertically slidable plates B² (Figs. 9-12), which plates are equipped at their upper edges with hinged guard-plates B³, which, when the tray is fully elevated, bridge the grooves in the lateral members of the door-jamb, as shown in Fig. 7, B⁴, vertical plates interposed between the lifter-bars B' and the outer plates B² and carrying at their upper ends inwardly extending guard-flanges B⁵ (Fig. 7), said plates B⁴ being provided, as shown in Fig. 6, with vertical slots 2, within which the slide-blocks 1ª form lost-motion connections between the lifter-bars B' and the plates B⁴, the purpose being to permit the plates B² to be elevated until the hinges of the guard-plates B³ are on a level with the guard-flanges B⁵, after which the plates move upwardly together until they assume the position shown in Fig. 7; C (Figs. 3-5 and 19), a vertically movable lift normally housed in a supplemental chamber, or housing, C', disposed back of the rear vertical wall of the safe, said lift comprising vertical slide-members 3, a cross-member 3ª connecting their upper ends, and a hood 3ᵇ mounted on the upper end of the fabricated slide described; C², a hydraulic ram which vertually constitutes a part of the door-lift, said ram being shown as comprising a pair of vertical cylinders 4 having their lower ends firmly secured to the bottom member 5 of the vertical door-housing C', and pistons, or plungers, 4ª, having their upper ends secured to the cross member 3ª of the door-lift; C³, (Figs. 8, 19 and 20), an equalizing device comprising a shaft 6 journaled in brackets 6ª carried by the vertical slide-member 3 and equipped with pinions 6ᵇ which engage fixed vertical racks 6ᶜ secured to the rear wall of the door-housing C'; D, (Figs. 5, 7 and 8) mechanism actuated indirectly by the motor through the medium of the door-lift and door, serving to actuate the article-holder B; and E, (Figs. 26-28) lift-actuating mechanism comprising an electric motor E', a pump E², a valve device E³, an oil reservoir E⁴, a pump-intake pipe E⁵, a pump-outlet pipe E⁶ leading to the valve device E³, cylinder feeding and exhausting pipes E⁷, leading to the lower ends of the cylinders 4, and seepage pipes, or drain pipes, E⁸, adapted to return to the reservoir such oil as may seep past the pistons, as will be understood from Fig. 29.

The safe-body A may be of any suitable construction. Preferably, it has fire-proof side-walls and bottom wall and a fire-proof closure. In the form illustrated, it comprises inner and outer steel shells 7 and 7ª, and a thermally insulating filling 7ᵇ. The door-opening is shown provided with suitable tongues and grooves to form an effective flame-resisting joint between the door and the safe-body when the door is in the closed position.

Referring to Figs. 1, 2 and 13-18, the safe-body preferably is provided near its rear corners with fixed housings 8 and 9, within which are mounted track-switches F and F' respectively. Referring to the fixed housing 9 as the right-hand housing (as viewed in Fig. 1), this housing contains also a limit-switch-actuating device G, whose function is to break the electric circuit when the door-lift reaches the upper end of its traverse.

One edge of the door $A^2$, preferably the rear edge, is equipped (see Figs. 3, 5 and 19) with a flange 10 to which are secured brackets 10$^a$ carrying pivots 10$^b$ which are journaled in forwardly extending flanges 3$^c$ which form portions of the slides 3 of the lift C, as best shown in Fig. 19. The door is equipped at its opposite edge (front edge) with guide-rollers 11 which are adapted to travel on tracks or surfaces 11$^a$ which constitute the extreme top surfaces of the end-walls of the safe-body, as shown in Fig. 5. When the door is being opened, its base-edge, or hinged edge, is lifted by the hoist, while the rollers 11 travel rearwardly on the end-walls of the safe-body. During this action, the tongues and grooves between the door and door-jamb become disengaged. A guard 12 is hingedly connected at its front edge with the front upper corners of the safe-body. It comprises a plate 12$^a$ and cam blocks 12$^b$ at the ends of said plate. The rollers 11 are adapted to roll under the cam-blocks 12$^b$ in the final portion of the closing movement of the door and thus swing the plate 12$^a$ upwardly and forwardly. One purpose of this guard-device is to prevent small articles from falling into the grooves in the door-jamb. Another purpose is to prevent injury to the hands.

The rollers 11 at the front edge of the door are adapted to enter guide-grooves, or tracks, 13 during the final portion of the hoisting of the door, as will be understood from Figs. 5 and 13–18. These grooves, or cam tracks, constitute portions of the mechanical switch-devices F and F', which are located in the fixed housings 8 and 9, respectively. The mechanical switches are of the same construction. The groove 13 is formed in the plate 13$^c$ fixedly mounted in the housing on a plate 14 which is secured by means of a plate 15 to the end wall of the safe-body A. Spacers 16 and screws 17 connect the plates 13$^c$ and 14. The track-switch proper is designated 18. It comprises a member 18$^a$ suspended from a pivot 19, and an up-standing member 18$^b$ mounted on the same pivot. The member 18$^a$ is provided with a stud 20 which is connected by a tension-spring 21 with a fixed stud 22. The pin 20 may move in an arc-like slot 23 with which the plate 14 is provided. The movable base-portion 18 of the track-switch is provided centrally with an up-standing spring-pressed stud 24 which is adapted to engage a central recess 25 in the base-portion of the member 18$^b$, as is best shown in Fig. 18.

The groove 13 communicates at its rear end with the vertical groove 13$^a$, and the latter communicates, also, with a track-groove 13$^b$ which is adapted to guide the roller 11 downwardly into a channel-track 26 provided by a U-shaped member 26$^a$, as will best be understood from Figs. 13 and 19. The U-shaped member 26$^a$ is spot-welded to a reinforcing corner member 27 mounted within the door-housing C'.

The construction and arrangement of the track-grooves and the mechanical switch are such that the roller 11, in passing from the groove 13 to the groove 13$^a$, will move the member 18$^b$ from the position shown in Fig. 13 to the position shown in Fig. 14. When the roller 11 reaches the upper limit indicated by the dotted lines in Fig. 14, the action of the spring 21 will cause the member 18$^b$ to return to the position shown in Fig. 13. Consequently, when the hoist permits the door to be lowered into the housing C', the rollers 11 will follow the track grooves 13$^b$ and enter the channel grooves 26.

In moving the door from the housed, idle position shown in Fig. 4 to the closed position, the guide-rollers 11 at the front edge of the door will travel upwardly through the track-grooves 13$^b$ into the vertical grooves 13$^a$, will pass the member 18$^b$ of the mechanical switch, and will then be guided downwardly through the groove 13, thus permitting the rollers 11 to travel again on the surfaces 11$^a$ of the end-walls of the safe as the door passes to the fully closed position.

Referring to Figs. 15, 16 and 34, the circuit of the electric motor E' is designated H, the current being supplied to the circuit through mains H' and H$^2$. In the illustration given, the switches controlling the circuit are: a normally open starting-switch H$^3$, a normally open stick-circuit switch H$^4$ (electromagnetically controlled), a normally closed stop-switch H$^5$, a normally closed limit-switch H$^6$, a normally open lock-controlled switch H$^7$, and normally closed drawer-controlled switches H$^8$, H$^9$, and H$^{10}$. As stated above, the bolt-controlled switch H$^7$ must be closed by withdrawing the bolt-work before the circuit can be energized. When the starting-switch H$^3$ is momentarily closed, the effect is to energize the electromagnet 28 and close the stick-circuit switch H$^4$. This remains closed, with the motor operating, until either the stop-switch or the limit-switch is opened, whereupon the motor circuit is broken.

The starting-switch H$^3$ and the stop-switch H$^5$ are conveniently controlled by push-buttons designated by these reference characters, located as shown in Fig. 1.

The manner in which the limit-switch H$^6$ is automatically opened will be understood from Figs. 15 and 16. The circuit H is shown in Fig. 15 to be provided with contacts 29 adapted to be bridged by a contact member 30 carried by a spring-actuated plunger 31. This plunger normally holds the switch-member 30 in elevated, closed position. The plunger may be depressed by means of a vertical rod or plunger 32 which forms a part of the device G. The upper end of the plunger is adapted to be struck by a stud 33 carried by a cam lever 34 which is pivoted at 35. When the roller 11 connected with the front corners of the door passes through the vertical slot 13$^a$ while the door is moving either toward or away from the closed position, the effect is to actuate the cam lever 34, depress the plunger G and open the limit-switch H$^6$. A spring 36 serves to return the plunger 32 to its upper position, thus permitting the switch H$^6$ to close automatically. Of course, when the limit-switch is open, the solenoid coil 28 is de-energized and the motor circuit remains broken until the starting-switch is again pressed, momentarily.

For emergency purposes, a manually actuated device for operating the pump is provided, as will be understood from Figs. 5 and 26. An armature shaft of the motor E' is connected by a coupler 37 to the pump-shaft 38, these shafts being thus direct-connected. The armature shaft is equipped with a pinion 39 with which may mesh a gear 40 on a shiftable, manually actuated crank-shaft 41. The shaft 41 is provided with a removable crank 42, and may be shoved inwardly to bring the gear 40 into mesh with the pinion 39. The spring 41$^a$ normally holds the gear 40 in the non-meshing position.

The drain-pipes E$^8$ for returning to the oil reservoir such oil as may seep past the piston preferably are connected with the cylinders 4 of the rams C² in the manner shown in Fig. 29, where the piston is shown at or near the upper end of its stroke. The piston-head is designated 4ᵇ. The stem 4ᵃ is provided with a reduced portion 4ᶜ upon which is a slidable packing-ring 4ᵈ, normally held spaced from the piston head 4ᵇ by means of a spring 4ᵉ. As the piston nears the upper end of its stroke, the packing-ring 4ᵈ seats against a shoulder at 4ᶠ, after which the spring 4ᵉ is pressed and any oil trapped below the piston-ring 4ᵈ is forced to return through the pipe E⁸ to the reservoir. It may be explained, also, that when the pump draws oil from the reservoir, it creates a partial vacuum which tends to draw the seepage-oil back through the pipes E to the reservoir.

As shown in Fig. 28, the reservoir preferably is provided with a relief valve 43 which is shown as comprising a casing 43ᵃ and ball valve 43ᵇ which occupies a seat in the upper part of the outer passage 43ᶜ. The casing is provided above the valve with an air vent 43ᵈ. Should any pressure build up in the reservoir, it will exhaust through the relief valve.

The valve-device E³ (Fig. 28) may be of any desired construction. In the illustration given, the device comprises a casing 44 provided with a main longitudinal bore 44ᵃ, and provided above said bore with another bore 44ᵇ; a valve 45 slidable in the bore 44ᵃ and equipped with a spring 45ᵃ which normally holds the valve in closed position, it being noted that the pipe E⁶ leading from the pump communicates with the valve-chamber 44ᵃ through a connection 45ᵇ; an outlet 46 leading from the valve-chamber to the duct 44ᵇ, said outlet passage being guarded by an upwardly opening valve 46ᵃ; and a drain-passage 47 leading from the conduit 44ᵇ to the reservoir. The passage 47 has a reduced portion 47ᵃ into which extends the inner end of a set screw 48, by means of which the size of the passage may be regulated. It is obvious that the more this passage is choked, the slower will be the descent of the ram which carries the door, after the motor has been shut off. When the pump operates to force oil through the pipe E⁶, the valve 45 is pushed to the left by the entering oil, thus bringing the reduced portion 45ᵇ into registration with the outlet passage 46, so that the oil can pass upwardly into the conduit 44ᵇ, with which is connected the ram-serving pipes E⁷. Any suitable valve, such as a differential fluid-pressure valve, well known to hydraulic engineers, may be used in lieu of valve 45.

Referring to Figs. 21–25, the door A² is shown equipped with locking mechanism I which comprises bolt-work I', a knob or handle I² for actuating the bolt-work, and a combination lock I³ for locking the bolt-work, equipped with a dial I⁴. One of the bolts 49 of the bolt-work normally holds the lock-controlled switch H⁷ open, as appears from Fig. 24. To permit the motor to operate, this switch must be closed, which is accomplished by retracting the bolts of the bolt-work. The switch H⁷ is shown as comprising a pair of contact-members 50 mounted on an insulating block 50ᵃ and adapted to be closed by a contact-member 51 carried by the plunger 51ᵃ which normally is held in the projected position by means of the bolt 49. When the bolt is retracted, a spring 51ᵇ serves to move the plunger and carry the member 51 to the switch-closing position. (See diagram, Fig. 34.)

The linkage of the bolt-work is actuated by a disk 52 attached to the inner end of the stem of the actuating handle I². The bolt 53 of the combination lock I³ is adapted to engage a shoulder 52ᵃ to lock the disk 52, as shown in Fig. 21. The disk is provided also with a shoulder 52ᵇ adapted to be engaged by a safety-latch device J, as shown in Fig. 25. This device comprises an oscillating member 54 supported on a pivot 54ᵃ, and an actuating rod 55, carrying a spring 55ᵃ adapted to be held under compression by a slidable striker 55ᵇ having a striker member 55ᶜ (Figs. 21 and 22) which is shown projected, but which normally is retracted by engagement with the door-jamb when the door is locked. The oscillatable member, or pawl, 54, is provided with a stop-pin 54ᵇ which is shown in the engaged position in Fig. 21, and with a safety-latch pin 54ᶜ which is shown in the latching-position in Fig. 25. The slidably mounted member 55ᶜ is adapted to engage the front jamb-member of the door-opening, it being noted that the front edge of the door is the last portion of the door to leave its seat in the door-opening operation. Normally, the spring 55ᵃ is under compression, so that the safety-stud 54ᶜ which rides upon the periphery of the disk 52 in the manner shown in Fig. 21 is ready to drop into position back of the shoulder 52ᵇ when the disk reaches the position shown in Fig. 25. This holds the bolts in retracted position while the door is being lifted from the door-opening. However, when the member 55ᶜ is permitted to be projected, the pressure upon the spring 55ᵃ is released, whereupon the spring 56 of the bolt-work operates to return the disk 52 to the position shown in Fig. 21. In this action, the shoulder 54ᶜ, which has a slight obliquity, serves to force the latch-pin 54ᶜ away from the latching position. It will be noted that the bolts 49 of the bolt-work have beveled ends, so that when the door is again brought to the closed position, the bolts will be automatically retracted and will then spring into the sockets with which the door-jamb is provided.

Describing more particularly the tray or article-holder B, reference is made to Figs. 5–7, 9–12, and 31–33. The article-holder is shown as a box-like container having double end-walls 57, side-walls 58, and a double bottom-wall 59. The side-walls of the tray have fixedly secured thereto vertical rack-sections 60 (Figs. 5 and 7), which are supplemented by folding-rack sections 60ᵃ which are pivotally mounted at 60ᵇ. The lower ends of the members 60ᵃ are equipped with rollers 60ᶜ adapted to move in vertical guides 60ᵈ and in inclined guides 60ᵉ which serve to fold the members 60ᵃ into horizontal position when the tray is lowered, as will be understood from Fig. 7.

The tray is equipped (Fig. 32) with vertical guide-bars 61 which move in suitable guides with which the safe-body is equipped.

The racks with which the tray is equipped are actuated by pinions 62, carried by parallel shafts 62ᵃ journaled in the front and rear walls of the safe-body, as will be understood from Figs. 5 and 7. These shafts, of course, flank to tray, the chamber B being made of sufficient width to accommodate the shafts and racks. These parts constitute a portion of the tray-actuating mechanism D (compare Fig. 8). The rear ends of the shafts 62ᵃ are equipped with sprocket wheels 62ᵇ which are engaged by sprocket chains 63, whose ends are joined by connectors 63ᵃ. The sprocket chains are secured to brackets 64 which are carried by a vertical movable horizontal bar 65 which is equipped with strikers 65ᵃ (compare Fig. 19). When the door A² descends to the housed idle position (Fig. 4), the free edge of the outer door-plate 66 engages the strikers 65ᵃ, depresses the bar 65, actuates the sprocket chains 63, turns the shafts 62ᵃ, and causes the article-holder to be raised to the elevated position shown in Fig. 7. When the door is lifted from the housed, idle position, the article-holder is permitted to descend under its own weight. It should be noted that the article-holder, nevertheless, is actuated, in final analysis, by the door-actuating mechanism. This is, the article-holder is actuated through the medium of the door-lift and door carried thereby.

In the illustration given, the article-holder is fitted in its base-portion with forwardly withdrawable drawers, designated K, shown in Fig. 1 as being three in number. In Fig. 31, the article-holder is shown in elevated position, with one of the drawers K in open position. One of the drawer-controlled switches H⁸ also appears in Fig. 31. Above the plane of the drawers, the article-holder is provided with a bottom-wall 67 upon which rest the removable file-boxes 68 which are equipped with tiltable front ends 68ᵃ. These members are mounted on pivots 69 which extend between the side-walls 68ᵇ of the file boxes. The member 68ᵃ is shown as comprising a front wing 68ᶜ and a rear wing 68ᵈ. Also, the members 68ᵃ are equipped with friction-wing 68ᵉ which engage the side-walls 68ᵇ of the boxes. When the article-holder is in the projected position, the members 68ᵃ may be thrown to the inclined position illustrated in Fig. 31 to permit the cards in the boxes to fan forwardly. When the article-holder descends into the safe-body, the front walls of the members 68ᵃ engage the front wall of the safe-body and are automatically pressed to the closed position indicated by the dotted lines in Fig. 31. That is, this occurs automatically if the operator fails to restore the front end-members 68ᵃ to the upright position before closing the door. The drawer-controlled switch H⁸ is shown as comprising a spring-contact member 70 carried by the drawer and co-acting fixed contact members 70ᵃ carried by a wall of the article-holder (compare Fig. 45).

Any desired tray-structure may be employed, and the arrangement may be variously modified to suit the needs of the user. If the signature-card boxes, or drawers, K, be omitted, the article-holder may be of less height and the vertical travel of the article-holder may be lessened.

Referring to Figs. 6–12, the lifter-bars B' are fixedly secured to the vertically slidable plates B², and the connecting screws 1 carry blocks 1ᵃ which are slidable in the slots 2 (Fig. 6) of the inner plates B⁴. The lifter-bars B' have projections 71 which extend into grooves 72 in th end-walls of the article-holder. Blocks, or fillets, 72ᵃ are secured in the lower portions of said grooves. As the holder B ascends, the arms 71 of the lifter-bars B' are engaged by the blocks 72ᵃ, whereupon the outer slide-plates B² are lifted until the hinges 73 are on a level with the flanges B⁵ of the inner plates B⁴, after which the plates rise together until they reach the position shown in Fig. 7, the guard-plates B³ being automatically turned to the groove-covering position by means of springs 74. The movement of the inner plates is effected by the small slide-blocks 1ᵃ which work in grooves 2. When the holder descends, the hinged guard-plates B³ are automatically swung to vertical position by engagement with the portions 75 of the door-jamb, as will be understood from Fig. 7.

The operation may be stated briefly:

Assuming the safe to be in the closed, locked position, the door A² is unlocked by manipulating the combination-lock by means of the dial-knob I⁴, and then turning the knob I² to retract the bolt-work I', which results in permitting the switch H⁷ to close. The device J serves temporarily to latch the bolt-work in the manner indicated in Fig. 25. After the spring-actuated member 55ᵇ is released from the pressure of the door-jamb, said member is projected, thus relieving the pressure upon the spring 55ᵃ, whereupon the spring 56 of the bolt-work is able to turn the disk 52 (Fig. 25) and force the latch-pin 54ᶜ out of engagement with the shoulder 52ᵇ, the bolt-work thus returning to the projected position and being capable of automatically locking the door to the door-jamb when the door is again closed.

In the locked position of the safe, the circuit of the electric motor E' is in the condition shown in Fig. 34. By momentarily pressing the starting-switch H³, the circuit becomes completely closed, the solenoid 28 operating to hold the switch H⁴ in closed position. The motor operates to pump oil from the reservoir to the lower ends of the cylinders of the hydraulic ram which operates the door-lift. The rear or hinged edge of the door is lifted and the door at the same time swings rearwardly, the rollers 11 at the front edge of the door rolling upon the upper surfaces of the end-walls of the safe-body. When the hydraulic lift reaches about the upper end of its traverse, the rollers 11 operate the track-switches, so that the door in descending will pass into the door-housing back of the rear wall of the safe. Also, a roller 11 of the door actuates the limit-switch A⁶ to break the circuit at this point, thus stopping the operation of the motor, the effect of this being to open the switch H⁴, also. When the pump ceases to operate, the oil in the cylinders 4 of the ram can be forced back into the reservoir, and the door-lift and the door carried thereby settle gradually to the housed, idle position back of the rear wall of the safe.

To close the door A², it is necessary that the signature-card drawers K shall all be closed, so that the switches H⁸, H⁹ and H¹⁰ will be closed. By closing the starting-switch H³, the motor will again be set in operation and will elevate the door-lift C to the position shown in Fig. 5, whereupon the limit-switch A⁶ will again be automatically opened, the current of the motor will be shut off, and the door-lift and suspended door will descend by gravity against the resistance of the oil in the cylinders of the ram, as the oil is gradually forced to return to the reservoir. During the ascending movement of the door in the closing operation, the track-switches are automatically set in position to direct the rollers 11 into the guide-grooves 13 so that the rollers, upon emerging from the said grooves, will ride upon the upper surfaces of the end-walls of the safe. In the final portion of the closing movement, the rollers will pass into the cam grooves of the blocks 12ᵇ and swing the guard-plate 12ᵃ upwardly and forwardly, so that if the hands of the operator should be resting upon the guard-plate, they will be lifted by the action of the guard-plate. During the lifting of the door from either the closed position or the idle position, the motor may be cut off by pressing the stop-switch H⁵, which results in opening the switch H⁴, whereupon the door will settle back to either closed position or idle position, depending upon its position at the time of the interruption of the circuit. During the descent of the door either to the closed position or the idle position, it is possible to close the starting-switch, supply current to the motor, and reverse the direction of movement of the door, i. e., lift the door.

The reliability of operation of the improved safe has been fully established by many thousands of operations. The vertical lift, actuated by a suitable fluid-pressure device, such as a hydraulic ram and an electric motor for supplying pressure, the circuit of the motor being under both automatic control and manual control, has been demonstrated to be admirably adapted to the purpose. The improvements described give staunchness of construction and ease and dependability of operation.

A steel shell L forms finish side-walls for the safe-body and provides a finish rear-wall for the door-housing C'.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In a safe: a safe-body having a door-opening in its top; an upwardly opening door seated in said door opening; a fluid-operated door-lift; and means for forcing fluid into and exhausting the same from said door-lift.

2. In a safe: a safe-body having a door-opening in its top; an upwardly-opening door seated in said door-opening; a projectable article-holder housed in said safe-body beneath said door; and means for actuating said door and article-holder, comprising a fluid-actuated lift disposed back of the rear wall of the safe-body and means for forcing fluid into and exhausting the same from said lift.

3. A safe as specified in claim 2, in which said fluid-actuated device comprises a vertical ram and a housing therefor disposed back of the rear wall of the safe-body, a pump, and a valve-device controlling admission to and exhaust from said ram.

4. In a safe: a safe-body having a door-opening in its top; a bodily-shiftable door seated in said door-opening; a fluid-pressure lift adapted to lift said door and suspend it in an upright plane and lower it to position adjacent one upright wall of the safe-body; and means for controlling fluid admission to and exhaust from said lift.

5. A safe as specified in claim 4, equipped with a projectable article-holder normally housed in said safe-body beneath said door; and mechanism actuated by said door in the lowering thereof serving to elevate said article-holder, said mechanism including journaled shafts geared to and serving to actuate said article-holder and shaft-actuating means comprising sprocket-chains and means carried thereby adapted to be actuated by said door during the lowering thereof to the position stated.

6. In a safe: a safe-body having an upwardly presented door opening; a door seated therein; locking-mechanism securing said door to said safe-body; a fluid-pressure lift adapted to actuate said door; a fluid reservoir; a pump connected thereto to draw fluid from said reservoir and deliver it to said fluid-pressure lift; and an electric motor for driving said pump, having a circuit controlled by said locking-mechanism.

7. In a safe: a safe-body equipped with a door-opening; a door seated in said opening; locking-mechanism securing said door to said safe-body; means for temporarily latching the locking-mechanism in retracted position during the initial movement of the door from the closed position; door-actuating mechanism; and an electric motor for driving said door-actuating mechanism having a circuit equipped with a switch which normally is held open by said locking-mechanism and permitted to close upon retraction of the locking-mechanism.

8. In means of the character set forth: a safe-body having in its upper portion a door-opening and a door-seat; a withdrawable door fitted to said seat; a vertically projectable article-holder normally housed in said safe-body beneath said door, said article-holder carrying a drawer; mechanism for actuating said door and article-holder, including an electric motor having a circuit controlled by the locking mechanism of said door and equipped with a switch controlled by said drawer.

9. In means of the character set forth: a body containing a chamber equipped with a door; a power-driven mechanism for actuating said door; and a projectable article-holder comprising drawers having means for preventing operation of the power-mechanism when the drawers are open but permitting operation of the power-mechanism when the drawers are closed.

10. In means of the character set forth: a body having a chamber provided in its upper portion with a door-opening; a door seated in said opening; mechanism for opening and closing said door; and a projectable article-holder normally housed in said chamber beneath said door, comprising a projectable tray having drawers fitted in its base-portion controlling the operation of said mechanism.

11. In a structure of the character set forth: a safe-body having a door-opening in its top; a bodily-shiftable door seated in said opening; a hydraulic lift to which one edge of said door is connected; a vertically projectable article-holder normally housed in said safe-body beneath said door; a housing for said door adjacent one of the vertical walls of the safe-body; and mechanism operative to lift said article-holder, said last-named mechanism being actuated through the medium of said hydraulic lift during its descent in the operation of lowering the door into said housing.

12. In means of the character set forth: a body having a storage-chamber and a door-opening in its upper portion; a bodily-shiftable door seated in said opening; mechanism for lifting said door and suspending it by one edge; and actuating-means for said mechanism, including an electric motor having a circuit equipped with an electromagnetically controlled switch, a starting-switch, and also with a limit-switch which is automatically opened when the door reaches the upper limit of its movement.

13. Means of the character set forth in claim 12, in which the door is equipped with locking-mechanism, including bolt-work, and said circuit is equipped with a normally open switch which closes when the bolt-work is retracted.

14. In means of the character set forth: a body provided with a storage-chamber and having a door-opening in its top; a door mounted in said opening; mechanism for opening said door; and a projectable article-holder equipped with lifters having lost-motion connection therewith; and vertically movable plates disposed adjacent each other, one of said plates being secured to and rising with the corresponding lifter and the other of said plates having lost-motion connection with the first-mentioned plate, said plates having their upper ends equipped with guard members adapted to close recesses in the door-opening when the article-holder is in its elevated position.

15. A structure as set forth in claim 14, in which the guard-member of one plate of each pair is a spring-actuated hinged member adapted to be automatically thrown into guarding position as the holder nears the upper end of its traverse.

16. In a safe: a safe-body having a door-opening in its top and having a door-housing outside one vertical wall; a door seated in said door-opening; a door-lift vertically movable in said housing and having hinge-connections with one edge of said door; and a hydraulic ram mounted in said housing and serving to actuate said door-lift.

17. In a safe: a safe-body having a door-opening in its top and having a door-housing outside one vertical wall; a door seated in said door-opening; a door-lift vertically movable in said housing and having hinge-connections with one edge of said door; a hydraulic ram mounted in said housing and serving to actuate said door-lift; a fluid reservoir; a pump for taking fluid from said reservoir and forcing it into the cylinders of said hydraulic ram; means for automatically draining said cylinders when the pump ceases to operate; and an electric motor for actuating said pump, having a circuit equipped with a switch which is automatically opened when the door reaches the upper end of its traverse and equipped also with a manually controlled starting-switch.

18. A safe as specified in claim 17, in which said electric circuit is equipped also with a switch which is held normally open when said door is in the locked position.

19. A safe as specified in claim 17, in which the edge of the door opposite the hinged edge is equipped with studs adapted to move in tracks with which the safe-body is equipped at its upper rear corners, said tracks having associated therewith track-switches.

20. A safe as specified in claim 17, in which the edge of the door opposite the hinged edge is equipped with studs adapted to move in tracks with which the safe-body is equipped at its upper rear corners, said tracks having associated therewith track-switches, and one of said tracks having associated therewith a device for operating a limit-switch in said circuit.

21. A safe as specified in claim 17, in which said door is equipped with cams and said safe-body is equipped with tracks through which said cams may pass, each track comprising a groove adapted to direct the lower edge of the door forwardly to the closed position or rearwardly to the housed, idle position.

22. A safe as specified in claim 17, in which the edge of the door opposite the hinged edge is equipped with cams and the rear corner portions of the safe-body are equipped with tracks, each track comprising an upper vertical portion and branches extending from the lower end of the vertical portion and adapted to direct the door, each track having associated therewith a track-switch adapted to be actuated by the cam with which the door is equipped.

23. In a safe: a safe-body having a door-opening in its upper end and having fixed housings at its rear-portion; tracks and track-switches in said housings; a door seated in said opening equipped with means movable in said tracks for guiding the door and actuating said track-switches; a vertically movable door-lift back of the rear wall of said safe-body having hinged connections with the rear portion of said door; and power-mechanism for actuating said door-lift.

24. In a safe: a safe-body having a door-opening in its upper end and having fixed housings at its rear portion; tracks and track-switches in said housings; a door seated in said opening; a vertically movable door-lift back of the rear wall of said safe-body having hinged connections with the rear portion of said door; a hydraulic pump for serving said lift; an electric motor for actuating said pump, said motor having a circuit equipped with a limit-switch mounted in one of said housings; and means on said door movable in said tracks for guiding said door and actuating said switches.

25. In a safe: a safe-body provided with a door-opening; a bodily-shiftable door seated in said opening; a hydraulic lift connected with one end of said door; a reservoir; a pump for taking liquid from said reservoir and actuating said lift; an automatic valve controlling the raising and lowering of said lift; and seepage pipes adapted to return to the reservoir liquid which seeps past the pistons of said hydraulic lift.

26. In a safe: a safe-body provided with a door-opening; a door seated in said opening; a hydraulic lift comprising cylinders and pistons; a pump; a reservoir and means for taking liquid from the reservoir and forcing it into said cylinders below said pistons and then permitting drainage from the cylinders below the pistons, including an automatically actuated valve controlling the admission to and drainage from the cylinders below said pistons; and seepage pipes connected with said cylinders above the pistons and adapted to return seepage oil to the reservoir.

27. In a safe: a safe-body provided with a door-opening and with a bodily-shiftable door; a vertically movable door-lift connected with said door and comprising a pair of vertically movable slides; an equalizer connecting said slides and constraining them to move in unison; a hydraulic ram serving to actuate said lift; and means for forcing liquid into the cylinders of said ram.

28. In means of the character set forth: a body provided in its upper end with a door-opening; a door seated in said opening; means for withdrawing said door from said opening; and a vertically movable article-holder normally housed beneath said door, said article-holder being equipped with file-boxes having tiltable end-members adapted to be automatically moved to the closed position during the lowering of said article-holder.

29. In a safe: a safe-body having a door-opening in its top and having a door-housing outside one vertical wall, a door-lift vertically movable in said housing and having hinge-connections with one edge of said door; means for elevating said door-lift and then permitting it to recede and lower the door into said door-housing; studs connected with said door opposite the hinged edge; and tracks at the rear portion of the safe adapted to guide said studs, said tracks having associated therewith track-switches adapted to be actuated by said studs.

30. A safe as specified in claim 29, in which an electric motor serves to actuate said door-lift, said motor having a circuit equipped with a limit-switch associated with one of said tracks and actuated through the medium of said door to break the circuit in the final portion of the upward movement of said door.

WILLIAM C. MILLER.
ALBERT L. ABBOTT.